United States Patent
Koma

[11] Patent Number: 5,248,150
[45] Date of Patent: Sep. 28, 1993

[54] TARGET POSITION DETECTING DEVICE FOR USE IN COMPUTER-CONTROLLED GUN SHOOTING GAME MACHINE OR THE LIKE

[75] Inventor: Yozo Koma, Tokyo, Japan
[73] Assignee: Kabushikigaisha Taito, Tokyo, Japan
[21] Appl. No.: 794,888
[22] Filed: Nov. 20, 1991
[30] Foreign Application Priority Data
  Feb. 14, 1991 [JP] Japan ................................ 3-42731
[51] Int. Cl.⁵ .............................................. F41J 5/00
[52] U.S. Cl. .................................................. 273/313
[58] Field of Search ............... 273/313, 314, 315, 316
[56] References Cited
U.S. PATENT DOCUMENTS
  4,099,719 7/1978 Dean et al. ........................ 273/316

Primary Examiner—William H. Grieb
Attorney, Agent, or Firm—Sughrue, Mion, Zinn, Macpeak & Seas

[57] ABSTRACT

A target position aimed at by a gun in a computer-controlled gun shooting game is detected. Data representative of the position of the gun aiming at the target are derived from X- and Y-volumes. The data is subjected to analog-to-digital conversion to provide decimal values. The decimal values are translated to coordinate values which represent a position on a monitor screen on which the target is displayed. To perform the translation, the X- and Y-volume data are derived while sequentially moving the gun to aim at two reference marks displayed at corner and center positions of the monitor screen. By multiplying a ratio of a distance between two reference marks on the screen to the gun moving distance to the decimal values, the target position is represented by coordinate values of the screen. With such a procedure performed prior to starting the gun shooting game, the target detection accuracy is preserved despite the position of the gun placed or the distance between the gun and the monitor screen.

8 Claims, 5 Drawing Sheets

TARGET POSITION DETECTING DEVICE FOR USE IN COMPUTER-CONTROLLED GUN SHOOTING GAME MACHINE OR THE LIKE

BACKGROUND OF THE INVENTION

1. Field of the Invention

The present invention relates to a target position detecting device for detecting a target position on a TV screen or a video projector screen. The device of the present invention is typically used in a computer-controlled gun shooting game machine or a video projector, wherein a target position aimed at by a gun or a position pointed out by a pointer is detected.

2. Description of Prior Art

Shown in FIG. 1 is a computer-controlled gun shooting game machine disclosed in Japanese Laid-Open Patent Publication No. 52(1977)-36900. In this game machine, a gun 2 is pivotally movable in both X-direction (leftward and rightward) and Y-direction (upward and downward) so that a target displayed on a screen 1a of a monitor 1 can be aimed at. The position of the gun 2 aiming at the target is detected by X- and Y-volumes 3, 4 having variable resistors in the interior thereof.

Specifically, the X-directional pivotal motion of the gun 2 is transmitted via rods 9a, 9b to a sector gear 5 with which a pinion gear 7 is meshingly engaged. The rotation of the pinion gear 7 is transmitted via a rod 3a to the X-volume 3. The resistance of the X-volume 3 is varied in accordance with a rotational angle of the rod 3a. On the other hand, the Y-directional pivotal motion of the gun 2 is transmitted via the rod 9a to a sector gear 6 with which a pinion gear 8 is meshingly engaged. The rotation of the pinion gear 8 is transmitted via a rod 4a to the Y-volume 4. The resistance of the Y-volume 4 is varied in accordance with a rotational angle of the rod 4a. With the detection of resistances of or voltages developed across the variable resistors in the X-and Y-volumes, the position of the gun 2 can be identified.

In the above-described game machine, there is a difficulty in performing a positional adjustment of the gun 2 relative to the monitor screen 1a. The positional setting of the sector gear 5 is performed in such a manner that when the gun 1 is in a position aiming at a target displayed at the center of the monitor screen 1a, the X-volume 3 is in the middle of the resistance of the variable resistor. The positional setting of the sector gear 6 is performed in a similar fashion. After such positional settings, the sector gear 6 is fixedly secured to the rod 9a with a nut 10, and the sector gear 5 to the rod 9b with a fastening screw (not shown).

However, with only the above-described procedure, the resistance of the X-volume 3 is usually symmetrically imbalanced when the gun 2 is moved to the leftmost and rightmost positions from the center of the screen 1a. Specifically, the decreased value of the resistance of the X-volume 3 when the gun 2 is moved to aim at the leftmost position on the screen 1a is usually not equal to the increased value of the resistance of the X-volume when the gun is moved to aim at the rightmost position on the screen 1a. This is also true with respect to the resistance of the Y-volume 4. To correct such imbalances, the positional settings are carried out for several times while moving the gun 2 to aim at different positions on the monitor screen 1a. The attachment positions of the sector gears 5, 6 are finally determined when all the conditions are compromised.

In addition to the above-described difficulty, there is another problem in that the target position cannot be detected with high accuracy due to variations in accuracy of the mechanism and in the resistances of the variable resistors used in X- and Y-volumes 3, 4.

SUMMARY OF THE INVENTION

The present invention has been made to solve the above-mentioned problems accompanying the conventional device, and accordingly it is an object of the invention to provide a target position detecting device which has a high position detecting capability with a simple adjusting procedure without being affected by the variations in accuracy of the mechanism and of variable resistors used in X- and Y-volumes.

To achieve the above and other objects, there is provided a target position detecting device which comprises image displaying means having a screen for displaying an image thereon, a point on the screen being defined by two coordinate values in two directions orthogonal to each other; target position specifying means for specifying a target position on the screen; detecting means connected to the target position specifying means for detecting the target position specified by the target position specifying means, the detecting means producing detection data representative of the target position specified by the target position specifying means; reference displaying means for displaying a plurality of references at predetermined positions of the screen; and target position computing means for computing coordinate values of the target position specified by the target position specifying means based on the detection data and coordinate values of each of the plurality of references, whereby the target position specified by the target position specifying means is represented by the coordinate values.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
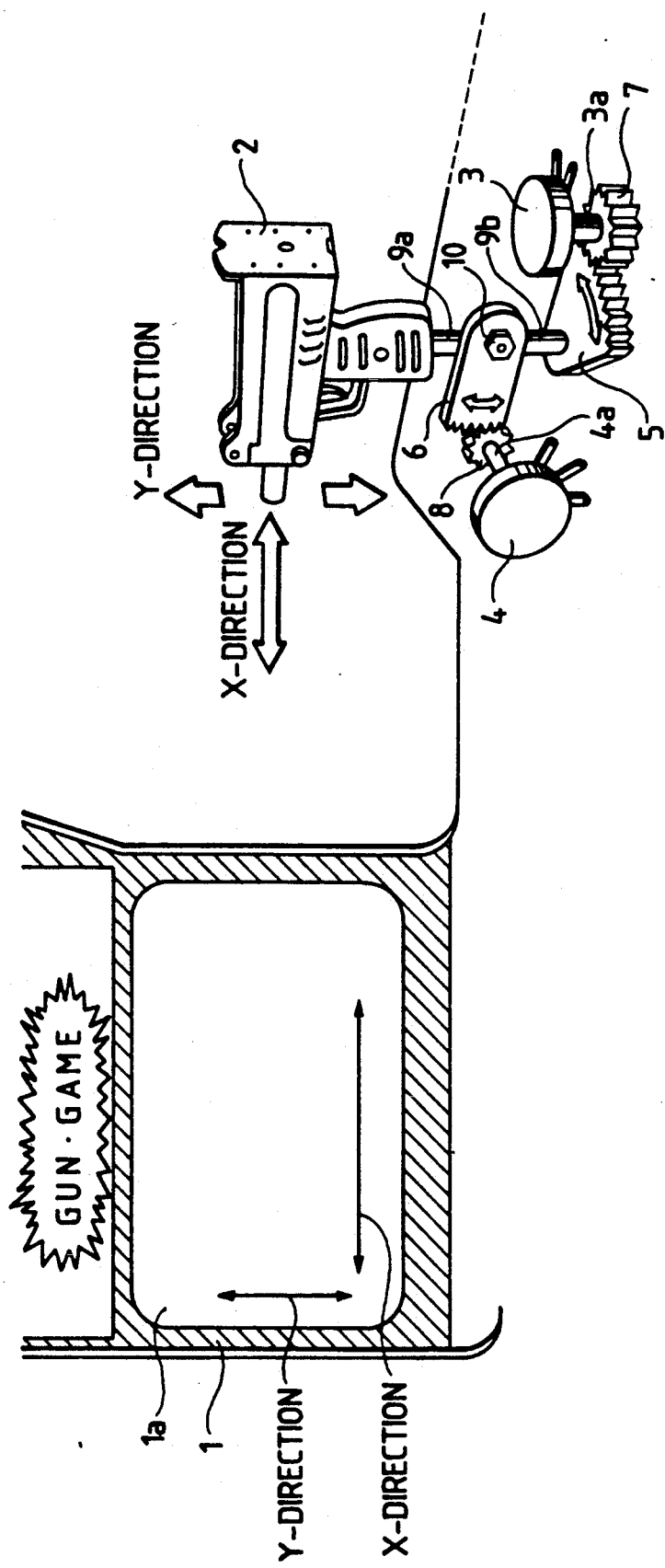
FIG. 1 is a perspective view showing a conventional target position detecting device.
Figure 2:
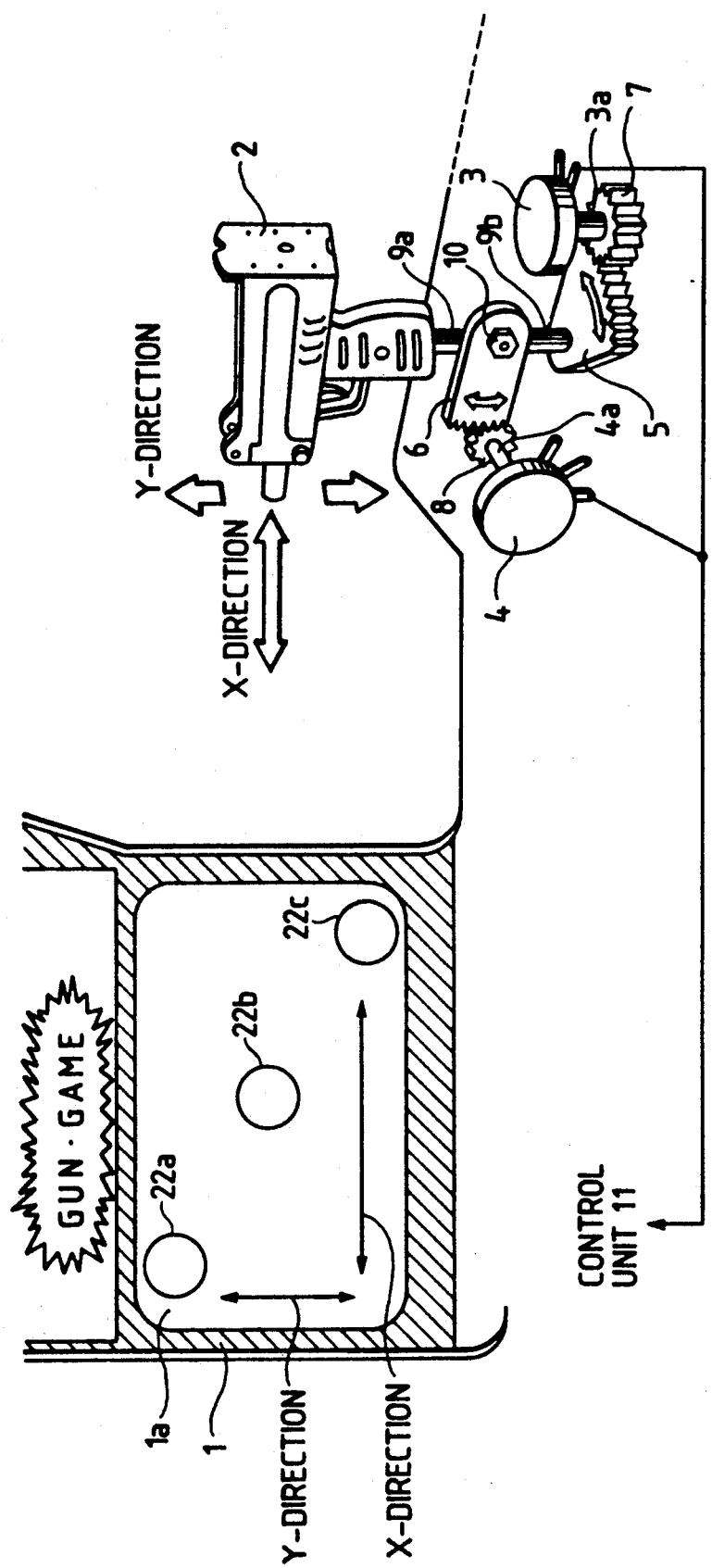
FIG. 2 is a perspective view showing a target position detecting device according to one embodiment of the present invention.

As shown in FIG. 2, a gun shooting game uses a gun 2 and a monitoring device 1 having a screen 1a on which a target to be shot by the gun 2 is displayed. Depending upon how many and what kinds of targets appearing in the screen 1a are to be accurately shot by the gun 2, the player's score is determined. The gun 2 is disposed apart an appropriate distance from the monitoring device 1 and is pivotally movable in both X- direction (leftward and rightward) and Y-direction (upward and downward). The X-directional position of the gun 2 is detected by an X-volume 3, and the Y-directional position of the gun 2 by a Y-volume 4.

The gun 2 has a grasping portion fixedly secured to the upper end of a rod 9a. A sector gear 5 is fixedly secured to the lower end of a rod 9b so as to be pivotally movable on a horizontal plane. A pinion gear 7 is disposed to meshingly engage the teeth of the sector gear 5. A rod 3a connects the X-volume 3 and the pinion gear 7. Another sector gear 6 is fixedly secured to the lower end of the rod 9a so as to be pivotally movable on a vertical plane. Another pinion gear 8 is disposed to meshingly engage the teeth of the sector gear 6. A rod 4a connects the Y-volume 4 and the pinion gear 8. Each of the X- and Y-volumes 3, 4 contains a variable resistor in the interior thereof whose resistance varies depending upon a rotational angle of the volume.

The X-directional motion of the gun 2 is transmitted to the X-volume 3 through the meshing engagement of the sector gear 5 and the pinion gear 7. On the other hand, the vertical or Y-directional motion of the gun 2 is transmitted to the Y-volume 4 through the meshing engagement of the sector gear 6 and the pinion gear 8. The X- and Y-volumes 3 and 4 are connected to a control unit 11 which is supplied with voltages derived from the X- and Y-volumes 3, 4. Based on the voltages supplied, the control unit 11 determines a position of the gun 2 aiming at a target displayed on the screen 1a. It is to be noted that the position of the gun 2 aiming at the target is defined by the voltages supplied from the X- and Y-volumes 3, 4 which in turn correspond to X-Y coordinate values of the monitor screen 1a.

Figure 3:
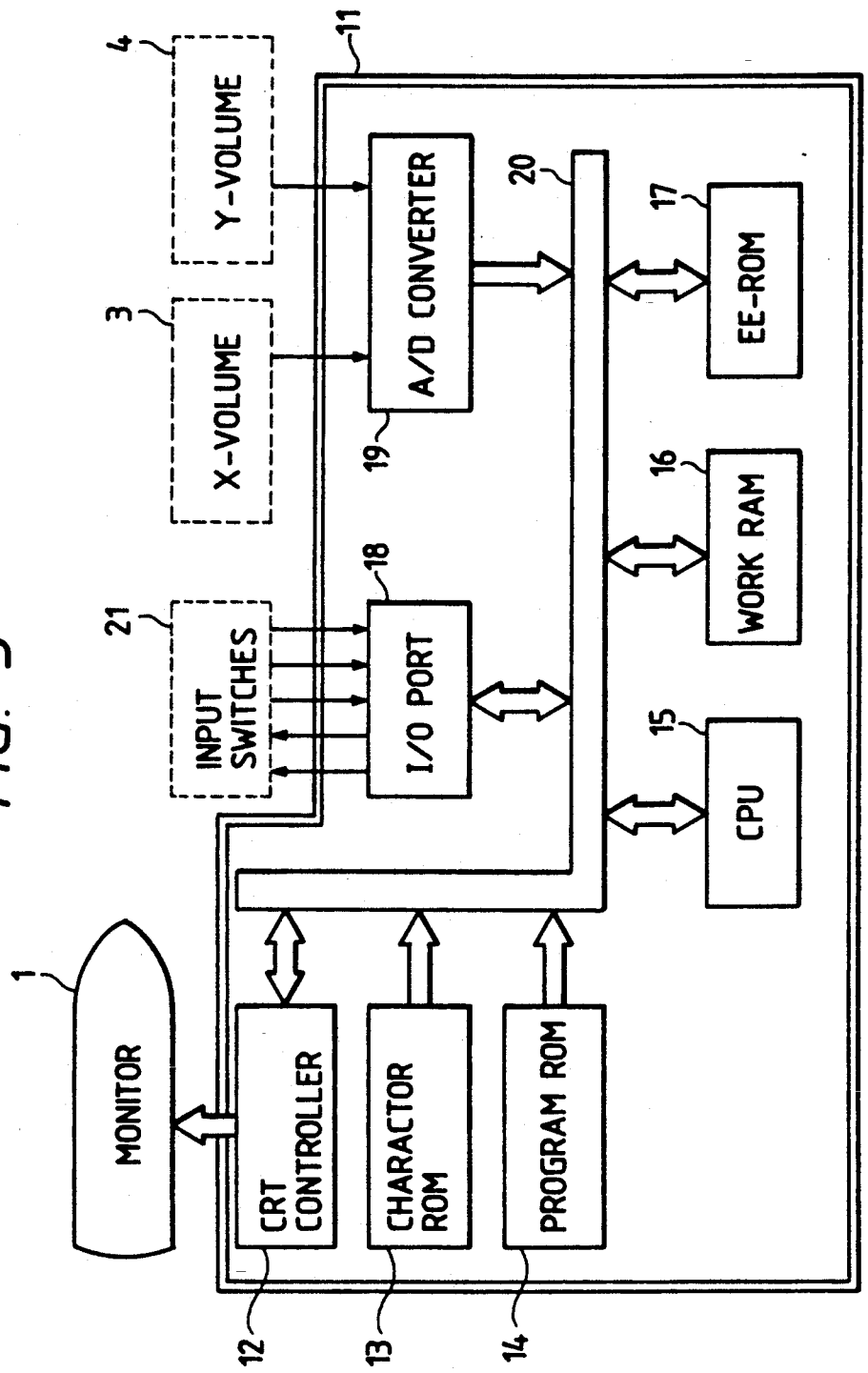
FIG. 3 is a block diagram showing the device according to the embodiment of the present invention.

The control unit 11 has an arrangement as shown in FIG. 3. The control unit 11 includes a central processing unit (CPU) 15 and various kinds of memories such as a character ROM (read-only memory) 13, a program ROM 14, a work RAM (random access memory) 16, and an EE-ROM (electrically erasable read-only memory) 17. The control unit 11 also includes an A/D (analog-to-digital) converter 19 having inputs connected to the X- and Y-volumes 3, 4, and an I/O (input/output) port 18 connected to input switches 21. The control unit 11 further includes a CRT controller 12 connected to the monitor 1. Those components are mutually connected via a bus 20.

The voltages derived from the X- and Y-volumes 3, 4 are supplied to the A/D converter 19 where the input voltages are subjected to analog-to-digital conversion to produce decimal data. The decimal data representative of the aiming position of the gun 2 are fed to the CPU 15 via the bus 20.

In accordance with the commands issued from the CPU 15, the CRT controller 12 displays background, target characters, and score on the monitor screen 1a. The character ROM 13 retains data regarding the characters. The program ROM 14 retains a game program and an initialization program to be described later. The work RAM 16 is used to temporarily store data necessary for the CPU 15 to execute various processings. The EE-ROM 17 stores reference position data and magnification values obtained through the processings of the initialization program. The I/O port 18 receives input data from the input switch 21 and carries out input/output control of various data including out-of-coin data.

Figure 4:
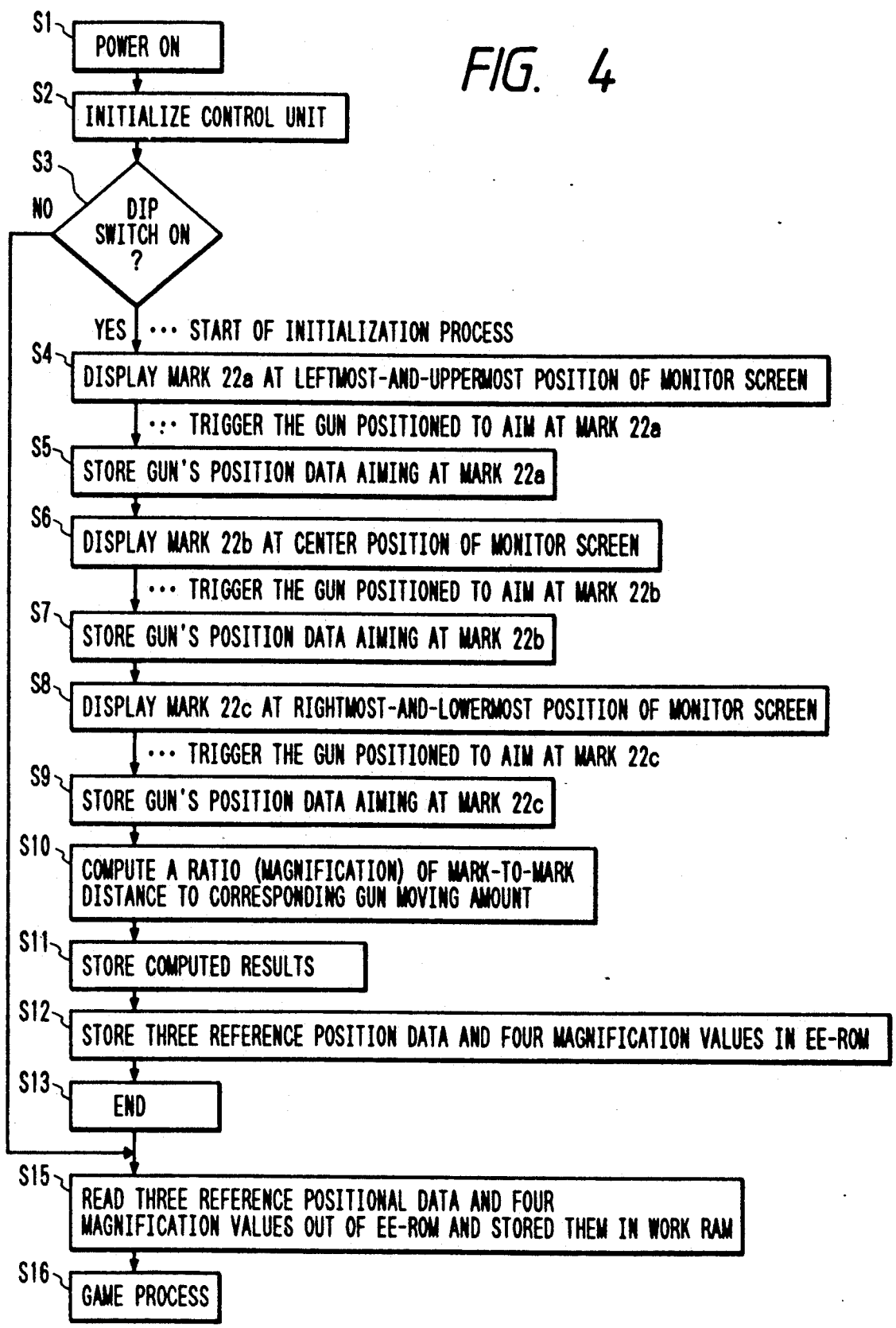
FIG. 4 is a flow chart for description of a control sequence of the device according to the embodiment of the present invention.

Next, the initialization program will be described with reference to the flow chart shown in FIG. 4. The program for the control unit 11 is commenced when the device is powered (step S1). After the control unit 11 has been initialized (step S2), a decision is made as to whether a gun's sight setting DIP switch is in an ON position or not (step S3). If yes, the routine proceeds to step S4 whereas if no, the routine proceeds to a game process through step S15. Note that the DIP switch is a part of the input switches 21.

At the commencement of the initialization program, the CPU 15 sequentially displays marks 22a, 22b, 22c at three reference positions on the monitor screen 1a (see FIG. 2). Firstly, the mark 22a is displayed at the leftmost-and-uppermost position of the monitor screen 1a (step S4). The position of the gun 2 is adjusted to aim at the mark 22a and is then triggered. In response to the triggering of the gun 2, the voltages are derived from the X- and Y-volumes 3, 4 and are subjected to analog-to-digital conversion. The resultant decimal data representative of the gun's position directed toward the leftmost-and-uppermost reference position is stored in the work RAM 16 (step S5).

Next, the CPU 15 displays the mark 22b at a center position of the monitor screen 1a (step S6). The gun 2 is rightwardly and downwardly moved to aim at the mark 22b and is then triggered. In response to the triggering of the gun 2, the voltages are derived from the X- and Y-volumes 3 and 4 and are subjected to analog-to-digital conversion. The resultant decimal data representative of the gun's position directed toward the central reference position is stored in the work RAM 16 (step S7).

Finally, the CPU 15 displays the mark 22c at a rightmost-and-lowermost position of the monitor screen 1a (step S8). The gun 2 is further rightwardly and downwardly moved to aim at the mark 22c and is then triggered. In response to the triggering of the gun 2, the voltages which are derived from the X- and Y-volumes 3 and 4 are subjected to analog-to-digital conversion. The resultant decimal data representative of the gun's position directed toward the rightmost-and-lowermost reference position is stored in the work RAM 16 (step S9).

Next, a ratio (magnification) of each of the distances between the marks 22a and 22b and between the marks 22b and 22c to the corresponding gun moving amount is computed (step S10). The decimal data corresponding to the gun's positions when aimed at the marks 22a, 22b, and 22c, as (X1, Y1), (X2, Y2), and (X3, Y3), respectively. The amount of movement of the gun 2 between the marks 22a and 22b is (X2−X1) in the X-direction and (Y2−Y1) in the Y-direction. Similarly, the amount of movement of the gun 2 between the marks 22b and 22c is (X3−X2) in the X-direction and (Y3−Y2) in the Y-direction. Therefore, representing the leftmost-and-uppermost, center, and rightmost-and-lowermost reference positions on the screen 1a where the marks 22a, 22b, and 22c are displayed as (x1, y1), (x2, y2), and (x3, y3), respectively, the ratios are given by the following equations.

$$\frac{x2 - x1}{X2 - X1} = KXA \qquad \frac{y2 - y1}{Y2 - Y1} = KYA$$

$$\frac{x3 - x2}{X3 - X2} = KXB \qquad \frac{y3 - y2}{Y3 - Y2} = KYB$$

Note that the x-y coordinate values on the screen 1a have been stored in the EE-ROM 17 as reference position data.

The entire region of the monitor screen 1a is divided into four segmental regions. Left upper region, right upper region, left lower region, and right lower region of the screen 1a will be referred to as regions A, B, C and D, respectively.

The ratios (magnifications) of the mark-to-mark distance on the screen 1a to the corresponding moving amount of the gun 2 are KXA, KYA) and (KXB, KYB) for the regions A and D, respectively. The ratios for the regions B and C are (KXB, KYA) and (KXA, KYB), respectively.

The CPU 15 stores the four magnification values KXA, KXB, KYA and KYB obtained in step S10 into the work RAM 16 (step S11). The leftmost-and-uppermost reference position data, the central reference position data, the rightmost-and-lowermost reference position data, and four magnification values temporarily stored in the work RAM 16 are stored in the EE-ROM 17 (step S12), whereby these data remain unerased after power off of the power supply. Upon completion of the storage of the data in the EE-ROM 17, the initialization program is terminated (step 13) and the routine proceeds to step S15.

In step S15, the leftmost-and-uppermost reference position data (x1, y1), the central reference position data (x2, x3), the rightmost-and-lowermost position data (x3, y3), and four magnification values KXA, KXB, KYA and KYB are read out of the EE-ROM 17 and written into the work RAM 16 (step S15), whereupon the game process is initiated (step 16).

Figure 5:
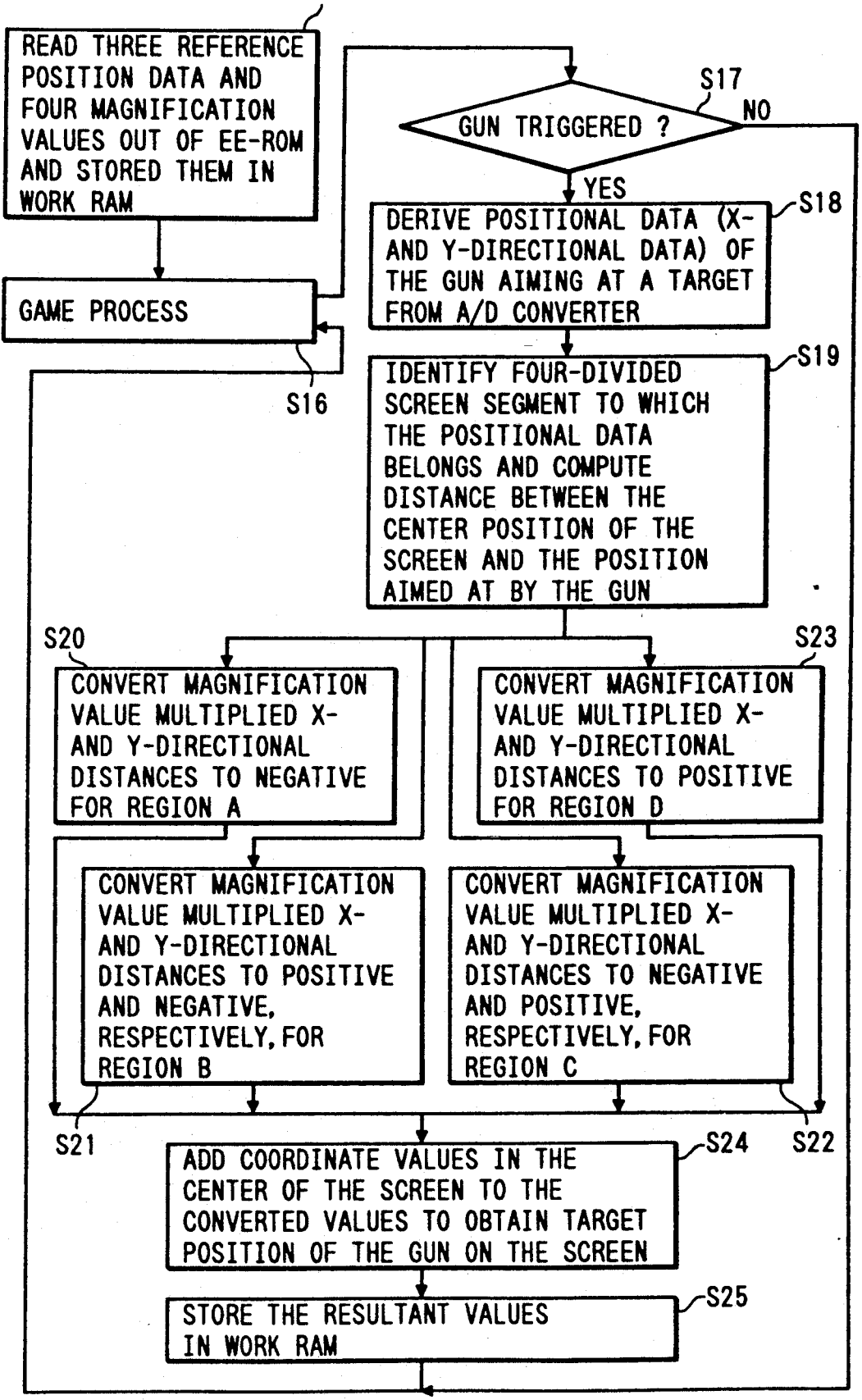
FIG. 5 is a flow chart for description of a control sequence of the device according to the embodiment of the present invention.

In the game process, the target position detecting device is operated as illustrated in the flow chart of FIG. 5. In step S17, it is checked whether or not the gun 2 is triggered. If no, the routine returns to the game process in step S16 whereas if yes, X- and Y-direction position data of the gun aiming at the target are derived from the A/D converter 19 (step S18). The decimal data (X, Y) obtained from the A/D converter 19 are compared with each of the gun's reference position data (X1, Y1), (X2, Y2), and (X3, Y3) to investigate the segmental screen region to which the current gun aiming position (X, Y) belongs. Simultaneously, X- and Y-directional distances between the current gun aiming position (X, Y) and the gun's center reference position (X2, Y2) are computed (step S19).

When the investigation indicates that the current gun aiming position (X, Y) belongs to the region A on the monitor screen 1a, X- and Y-directional gun moving amounts between the current gun aiming position (X, Y) and the gun's central reference position (X2, Y2) are computed and the magnification values KXA and KYA in the region A are multiplied to the computed results (X−X2) and (Y−Y2) on directional basis. The resultant X- and Y-directional data are converted to negative values while remaining each of the absolute value unchanged (step S20).

When the investigation indicates that the current gun aiming position (X, Y) belongs to the region B on the monitor screen 1a, X- and Y-directional gun moving amounts between the current gun aiming position (X, Y) and the gun's central reference position (X2, Y2) are computed and the magnification values KXB and KYA in the region B are multiplied to the computed results (X−X2) and (Y−Y2) on directional basis. The resultant X-directional data is converted to a positive value whereas the resultant Y-directional data is converted to negative values while remaining each of the absolute values unchanged (step S21).

When the investigation indicates that the current gun aiming position (X, Y) belongs to the region C on the monitor screen 1a, X- and Y-directional gun moving amounts between the current gun aiming position (X, Y) and the gun's central reference position (X2, Y2) are computed and the magnification values KXA and KYB in the region C are multiplied to the computed results (X−X2) and (Y−Y2) on directional basis. The resultant X-directional data is converted to a negative value whereas the resultant Y-directional data is converted to a positive value while remaining each of the absolute values unchanged (step S22).

When the investigation indicates that the current gun aiming position (X, Y) belongs to the region D on the monitor screen 1a, X- and Y-directional gun moving amounts between the current gun aiming position (X, Y) and the gun's central reference position (X2, Y2) are computed and the magnification values KXB and KYB in the region D are multiplied to the computed results (X−X2) and (Y−Y2) on directional basis. The resultant X- and Y-directional data are converted to positive values while remaining each of the absolute values unchanged (step S23).

By adding the x- and y-directional screen coordinate values x2 and y2 to the values obtained in each of the steps 20 through 23, the target position (x, y) on the screen 1a can be identified (step S24). The data regarding the target position (x, y) are stored in the work RAM 16 (step 25), whereupon the routine returns to the game process (step S26).

While the present invention has been described with respect to a specific embodiment, it could be appreciated to one skilled in the art that a variety of changes and modifications may be made without departing from the scope and spirit of the present invention. For example, although the foregoing description has been made with respect to the case where the present invention is applied to a computer-controlled gun shooting game machine, the present invention is also applicable to a video projector or the like to detect a position pointed out by a pointer.

Further, in the foregoing description, the monitor screen 1a is divided into four segmental regions to obtain the ratio of the mark-to-mark distance to the corresponding gun moving amount in each of the divided segmental regions. However, the screen 1a may be divided into more than four segmental regions while selecting more than three reference positions on which the marks are displayed.

What is claimed is:

1. A target position detecting device comprising:
    image displaying means having a screen for displaying an image thereon, a point on the screen being defined by two coordinate values in two directions orthogonal to each other;
    target position specifying means for specifying a target position on the screen;
    detecting means connected to said target position specifying means for detecting the target position specified by said target position specifying means, said detecting means producing detection data representative of the target position specified by said target position specifying means;
    reference displaying means for displaying a plurality of references at predetermined positions on the screen; and
    target position computing means for computing coordinate values of the target position specified by said target position specifying means based on the detection data and coordinate values of each of the plurality of references, the target position specified by said target position specifying means being represented by the coordinate values, wherein the screen of said image displaying means is substantially of rectangular shape defined by four corners, and wherein three references are displayed by said reference displaying means at a center position and two point-symmetrical corner positions of the screen with respect to the center position, and wherein the screen is divided into four segmental regions, and further comprising identification means for identifying a segmental region to which the target position specified by said target position specifying means belongs.

2. The device according to claim 1, wherein said target position specifying means is movable in two directions orthogonal to each other and the target position is specified by a position of said target position specifying means.

3. The device according to claim 1, wherein said target position specifying means specifies two references displayed in the center and one of the two corner positions of the screen, said detecting means detecting positions of the two references and producing a first reference detection data representative of the positions of the two references specified by said target position specifying means, wherein said target position computing means computing the coordinate values of the target position specified by said target position specifying means based on the first ratio of a first distance to a second distance, the first distance being defined by a distance between the positions of the two references displayed on the screen, the first distance being represented by the coordinate values, and the second distance being defined by a distance between the positions of the two references specified by said target position specifying means.

4. The device according to claim 3, wherein when said identification means identifies a segmental region including the center and one of the corner positions, said target position computing means computing the coordinate values of the target position specified by said target position specifying means by multiplying the first ratio to the detection data.

5. The device according to claim 4, wherein said detection data is in the form of decimal value.

6. The device according to claim 3, wherein said target position specifying means further comprising means for specifying two references displayed in the center and another of the corner positions of the screen, said detecting means detecting positions of the two references in the center and another one of the corner positions of the screen and producing a second reference detection data representative of the positions of the two references in the center and another one of the corner positions of the screen, and wherein said target position computing means computing the coordinate values of the target position specified by said target position specifying means based on a second ratio of a third distance to a fourth distance, the third distance being defined by a distance between the positions of the two references displayed at the center and another one of the corner positions of the screen, the third distance being represented by the coordinate values, and the fourth distance being defined by a distance between the positions of the two references in the center and another one of the corner positions of the screen specified by said target position specifying means.

7. The device according to claim 6, wherein when said identification means identifies a segmental region including the center and another one of the corner positions, said target position computing means computing the coordinate values of the target position specified by said target position specifying means by multiplying the second ratio to the detection data.

8. The device according to claim 7, wherein said detection data is in the form of decimal value.

* * * * *